(12) United States Patent
Dianda et al.

(10) Patent No.: US 7,853,238 B1
(45) Date of Patent: Dec. 14, 2010

(54) POWERLINE BASE STATION

(75) Inventors: Janet Ruth Dianda, Ashburn, VA (US); Iyad Tarazi, Great Falls, VA (US); Sunil Prasad, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 771 days.

(21) Appl. No.: 11/689,808

(22) Filed: Mar. 22, 2007

(51) Int. Cl.
*H04M 9/00* (2006.01)
*H04B 1/38* (2006.01)

(52) U.S. Cl. .................. 455/402; 455/560; 455/561

(58) Field of Classification Search ............. 455/561, 455/562.1, 402, 422.1, 433, 524, 560, 550.1; 370/485; 340/538
See application file for complete search history.

(56) References Cited

U.S. PATENT DOCUMENTS

| | | | |
|---|---|---|---|
| 5,682,256 A | 10/1997 | Motley et al. | |
| 5,832,364 A | 11/1998 | Gustafson | |
| 5,949,564 A | 9/1999 | Wake | |
| 6,243,413 B1 * | 6/2001 | Beukema | 375/222 |
| 6,243,571 B1 | 6/2001 | Bullock et al. | |
| 6,246,868 B1 | 6/2001 | Bullock et al. | |
| 6,370,396 B1 * | 4/2002 | Meiksin et al. | 455/560 |
| 6,525,855 B1 | 2/2003 | Westbrook et al. | |
| 6,653,932 B1 | 11/2003 | Beamish et al. | |
| 6,778,817 B1 | 8/2004 | Bullock et al. | |
| 6,788,666 B1 | 9/2004 | Linebarger et al. | |
| 6,826,163 B2 | 11/2004 | Mani et al. | |
| 6,826,164 B2 | 11/2004 | Mani et al. | |
| 6,831,901 B2 | 12/2004 | Millar | |
| 6,922,135 B2 * | 7/2005 | Abraham | 340/310.17 |
| 6,958,680 B2 * | 10/2005 | Kline | 370/487 |
| 6,963,552 B2 | 11/2005 | Sabat et al. | |
| 6,985,714 B2 | 1/2006 | Akiyama et al. | |
| 7,050,831 B2 * | 5/2006 | Meiksin et al. | 455/560 |
| 7,269,403 B1 * | 9/2007 | Miao | 455/402 |
| 7,426,581 B2 * | 9/2008 | Chan et al. | 709/250 |
| 2001/0036163 A1 | 11/2001 | Sabat et al. | |
| 2002/0089951 A1 | 7/2002 | Hyun et al. | |
| 2002/0131387 A1 | 9/2002 | Pitcher et al. | |
| 2002/0186436 A1 | 12/2002 | Mani et al. | |
| 2002/0191565 A1 | 12/2002 | Mani et al. | |
| 2003/0016418 A1 | 1/2003 | Westbrook et al. | |
| 2004/0057393 A1 | 3/2004 | Bianchl et al. | |
| 2004/0198453 A1 | 10/2004 | Cutrer et al. | |
| 2004/0204097 A1 | 10/2004 | Scheinert et al. | |
| 2005/0147067 A1 | 7/2005 | Mani et al. | |

(Continued)

OTHER PUBLICATIONS

U.S. Appl. No. 11/378,998, filed Mar. 17, 2006, "Signal Conditioner and Method for Communicating over a Shared Transport Medium a Combined Digital Signal for Wireless Service". Inventors: Sunil Prasad and Janet Ruth Dianda.

(Continued)

*Primary Examiner*—Sonny Trinh (57) ABSTRACT

Systems and methods for providing in-building wireless communications are provided. A master base transceiver station can include a standards-compliant powerline modem coupled to one or more slave base transceiver stations and/or antenna modules. A bridge can be provided that includes a standards-compliant powerline modem coupled to one or more base transceiver stations. The standards-compliant powerline modems communicate standards-compliant digital signals over powerlines. The master base transceiver station or bridge is coupled to a mobile switching center/base station controller via a network.

16 Claims, 8 Drawing Sheets

U.S. PATENT DOCUMENTS

2005/0157755 A1* 7/2005 Kashkarov .................. 370/473
2005/0172198 A1 8/2005 Millar
2005/0226625 A1 10/2005 Wake et al.
2005/0243785 A1 11/2005 Sabat et al.
2005/0254516 A1* 11/2005 Binder ....................... 370/463
2007/0222579 A1* 9/2007 Berkman .................... 340/538
2007/0230498 A1* 10/2007 Fujiwara et al. ............ 370/442
2008/0056338 A1* 3/2008 Yaney et al. ................ 375/222

OTHER PUBLICATIONS

U.S. Appl. No. 11/405,917, filed May 22, 2006, "System and Method for Transmitting Wireless Digital Service Signals Via Power Transmission Lines," Inventors: Janet Ruth Dianda and Sunil Prasad.

* cited by examiner

POWERLINE BASE STATION

BACKGROUND OF THE INVENTION

Service providers of wireless communication systems are continuously working on improving the wireless coverage of their respective systems. They employ techniques such as providing more base transceiver stations (BTS) within a given area, providing BTSs in areas not previously covered, and improving the performances of BTS and network equipment to reduce the probability of dropped calls and signal interference due to poor radio frequency (RF) environments.

Among these on-going developments is the improvement of wireless coverage inside buildings, which includes offices, dwellings and other structures. Buildings generally have an adverse effect on the RF environment of a wireless communication system. They may be constructed out of many RF affecting materials, such as grounded steel frames, that interfere with and/or reduce the signal strength of wireless communication signals inside of the building.

Attempts have been made at improving the wireless coverage inside buildings. One of these is to employ a repeater outside of a building and distributed antenna modules strategically placed inside of the building. Another is to employ micro-BTSs that are coupled to a mobile switching center/base station controller (MSC/BSC) or MSC. These systems typically require coaxial or twisted pair cables to be run to the location of each distributed antenna module or micro-BTS.

SUMMARY OF THE INVENTION

One problem with the afore-mentioned techniques for improving wireless coverage within buildings is that not all buildings are wired with coaxial or twisted pair cables and/or not all businesses or persons have the authority or the budget to run these cables throughout a building. Accordingly, the exemplary embodiments of the present invention overcome these and other deficiencies of conventional in-building wireless systems.

In accordance with exemplary embodiments of the present invention, systems and method involve a one or more base transceiver stations that comprise a standards-compliant powerline modem. The base transceiver stations can be separately coupled, via a powerline, to a bridge device, which in turn is coupled to a base station controller. Additionally, or alternatively, one base transceiver station can be coupled to one or more base transceiver via a powerline, and the one base transceiver station can be coupled to a base station controller. Accordingly, the one base station and the one or more base stations each include a standards-compliant powerline modem. A base transceiver station can also be coupled to one or more antenna modules via a powerline. In this case, the base transceiver station and the one or more antenna modules each include a standards-compliant broadband modem.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1A:
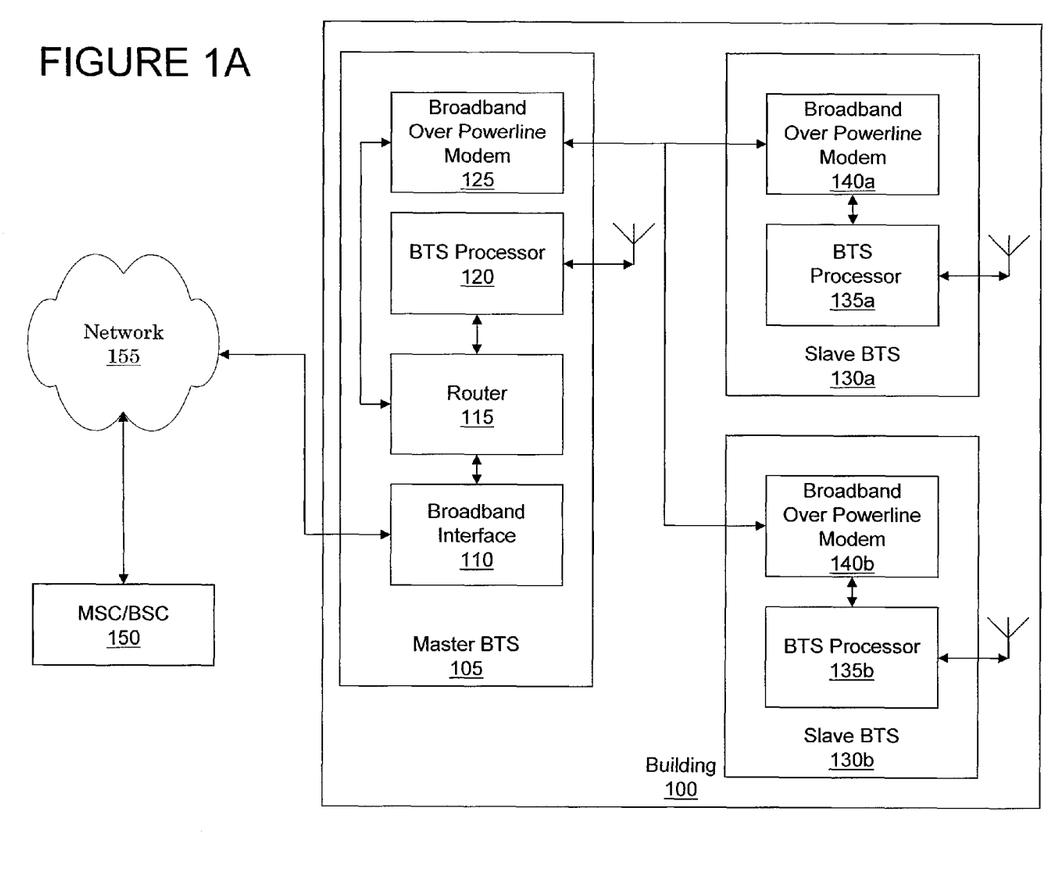
FIG. 1A is a block diagram of an exemplary system in accordance with a first aspect of the present invention.

FIG. 1A is a block diagram of an exemplary system in accordance with a first aspect of the present invention. The system includes a master BTS 105 coupled to one or more slave BTSs 130a and 130b, all of which can be located in building 100. Master BTS 105 is coupled to a mobile switching center/base station controller (MSC/BSC) 150 via network 155. Specifically, master BTS 105 includes broadband interface 110 for communicating with MSC/BSC 150. Broadband interface 110 is any appropriate interface for communicating over network 155, and can include a digital subscriber line (DSL) interface, asynchronous DSL (ADSL) interface, ADSL 2 plus (ADSL 2+) interface, data over cable service interface specification (DOCSIS) interface, WiMAX (i.e., 802.16) interface, broadband over powerline (BPL)/power line communication (PLC) interface, optical fiber interface, or any other wireless or wireline medium interface that can support broadband traffic. Network 155 can include one or more networks compliant with one or more of the aforementioned transmission mediums (e.g., one or more managed Internet Protocol (IP) networks). MSC/BSC 150 can be a component of a wireless macro network.

Master BTS 105 includes router 115, coupled to broadband interface 110. Router 115 is coupled to BTS processor 120 and broadband over powerline modem 125. Broadband over powerline modem 125 is compliant is with one or more broadband powerline communication standards, such as HomePlug, Universal Powerline Association's (UPA) Powerline Communications (PLC) standard, or the like. Each of the standards employs digital signals for communication over the standard powerlines, which allows more information to be communicated over such powerlines compared to analog signals. Moreover, by employing a standards-based modem, communications from broadband over powerline modem 125 can coexist with other powerline communications.

BTS processor 120 can include a processor and memory for implementing BTS functionality. The processor can be any type of processor, including a microprocessor, field programmable gate array (FPGA), application specific integrated circuit (ASIC) and/or the like. The memory can be any type of memory including read-only memory (ROM), random access memory (RAM), flash memory, a hard drive and/or the like.

BTS processor 120 provides conventional BTS functionality, which is much greater than that of a repeater, which merely amplifies and retransmits received signals. Specifically, as will be recognized by those skilled in the art, a BTS provides wireless communication between wireless stations and a wireless network, and contains equipment for transmitting and receiving radio signals, antennas, and equipment for communications with the BSC and/or MSC. A BTS provides a paging channel over the air, based on its base station identification, and wireless stations can detect the paging signals and request registration with or handoff to that BTS. A BTS can perform ranging with the handsets (signals to increase or decrease output power).

In contrast to a BTS, a repeater receives a signal from a BTS located elsewhere, amplifies that signal, and re-broadcasts the signal over one or more antennas. The repeater does not have base station identification, nor does it have its own paging channel. It just re-broadcasts information, (such as a paging channel information, control channels and user traffic channels) received from a BTS after boosting the signal. The wireless stations will detect the paging channel from the remote BTS, and exchange information with the BTS. The signal will just pass through, and be amplified by, the repeater. As such, a location register will indicate that a wireless station communicating with a repeater is located at the BTS from which it is rebroadcasting the paging signals.

BTS processor 120 is coupled to one or more antennas for transmitting and receiving wireless signals. These wireless signals can be any type of wireless signals, including Code Division Multiple Access (CDMA), Evolution Data-Optimized (EVDO), Global System for Mobile Communications (GSM), Universal Mobile Telephony (UMTS), integrated Digital Enhanced Network (iDEN), WiMAX and/or the like.

Router 115 receives communication signals from broadband interface 110, determines a destination of the signals and provides them to BTS processor 120 and/or broadband over powerline modem 125. Router 115 can also receive communication signals from modem 125 and provide these communication signals to broadband interface 110 or BTS processor 120. Router 115 can further receive communication signals from BTS processor 120 and provide these signals to broadband interface 110 or modem 125.

Although router 115 is illustrated as being a discrete component, the router can be a component of BTS processor 120 or broadband over powerline modem 125. When router 115 is a component of broadband over powerline modem 125, the modem can be coupled to broadband interface 110 and BTS processor 120. Router can also include a location register, similar to a visitor location register (VLR) to track the wireless stations supported by each BTS in building 100. For example, when a wireless station is supported by slave BTS 130b, then the location register of the router 115 would indicate that this BTS is currently supporting that wireless station. Additionally, or alternatively, master BTS 105 can include a location register, or router can access an external location register (e.g., a HLR or VLR) via network 155.

Slave BTSs 130a and 130b respectively include a broadband over powerline modem 140a and 140b, a BTS processor 135a and 135b and one or more antennas. Broadband over powerline modems 140a and 140b operate in a similar manner to that of broadband over powerline modem 125, and a BTS processors 135a and 135b operate in a similar manner to that of BTS processor 120.

Figure 1B:
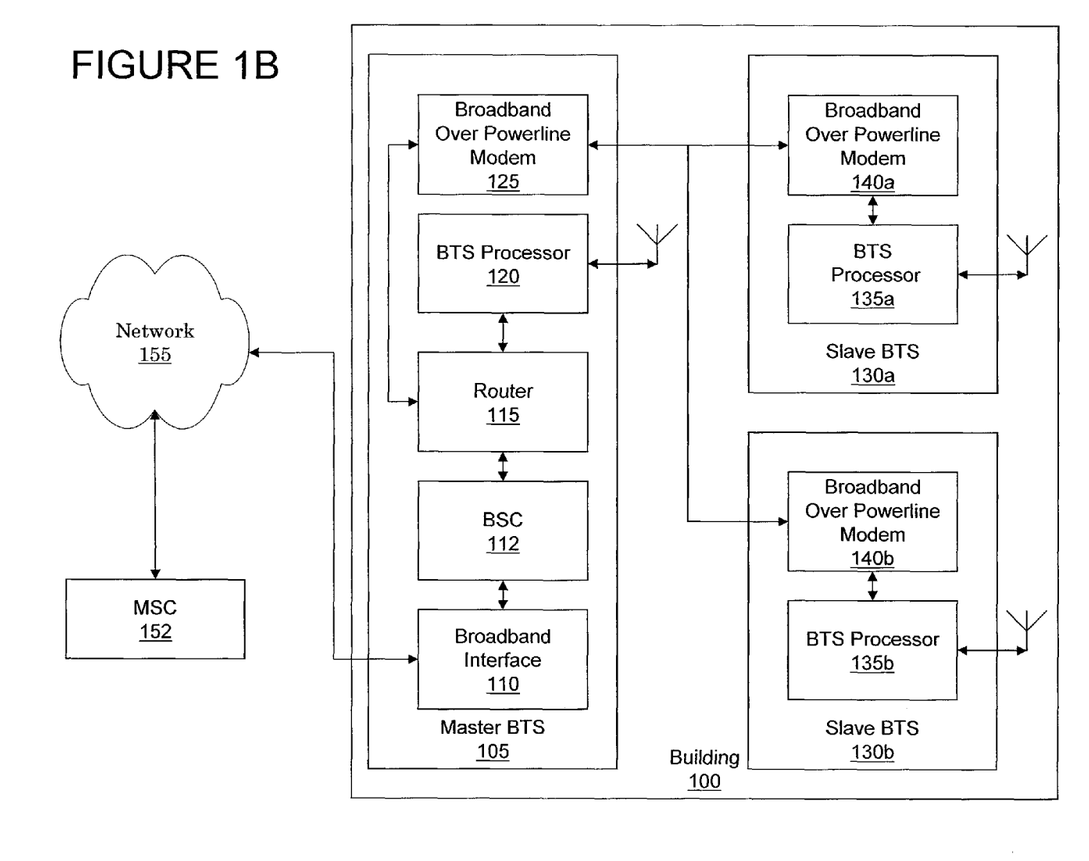
FIG. 1B is block diagram of an exemplary system in accordance with a second aspect of the present invention.

FIG. 1B is a block diagram of an exemplary system in accordance with a second aspect of the present invention. The difference between the systems of FIGS. 1A and 1B is that in the system of FIG. 1B master BTS 105 includes BSC 112, and is coupled to MSC 152, whereas in the system of FIG. 1A the BSC functionality is located in MSC/BSC 150.

Figure 1C:
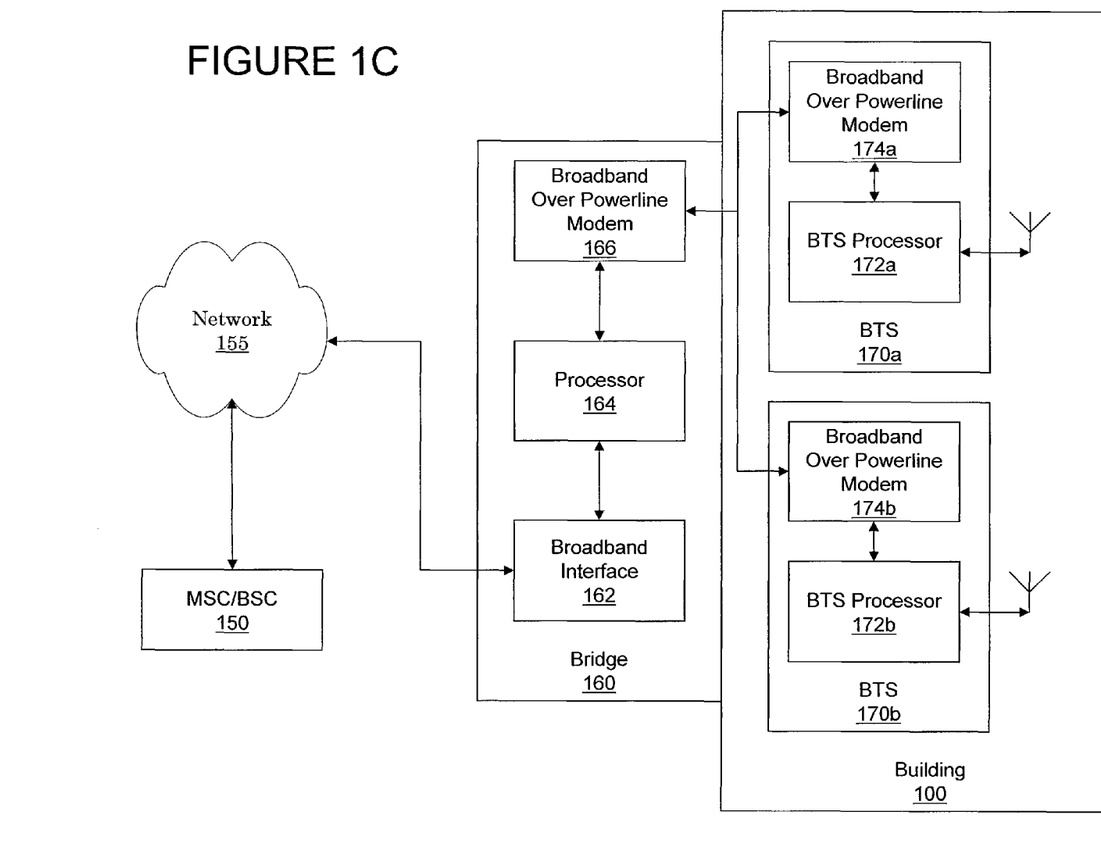
FIG. 1C is block diagram of an exemplary system in accordance with a third aspect of the present invention.

FIG. 1C is block diagram of an exemplary system in accordance with a third aspect of the present invention. In the system of FIG. 1C, bridge 160 couples one or more BTSs 170a and 170b to MSC/BSC 150. Accordingly, bridge 160 includes broadband interface 162 for communicating with MSC/BSC 150 over network 155. Bridge 160 can be co-located with a powerline transformer (not illustrated). Broadband interface 162 is coupled to processor 164, which in turn is coupled to broadband over powerline modem 166. Broadband interface 162 operates in a similar manner to that of broadband interface 110. Broadband over powerline modem 166 is coupled, via a powerline, to a corresponding broadband over powerline modem 174a and 174b of BTSs 170a and 170b. BTSs 170a and 170b each include a BTS processor 172a and 172b, and one or more antennas. Processor 164 can include a location register for tracking which mobile stations are supported by BTSs 170a and 170b, bridge 160 can include a location register or processor 164 can access an external location register via network 155.

Figure 2A:
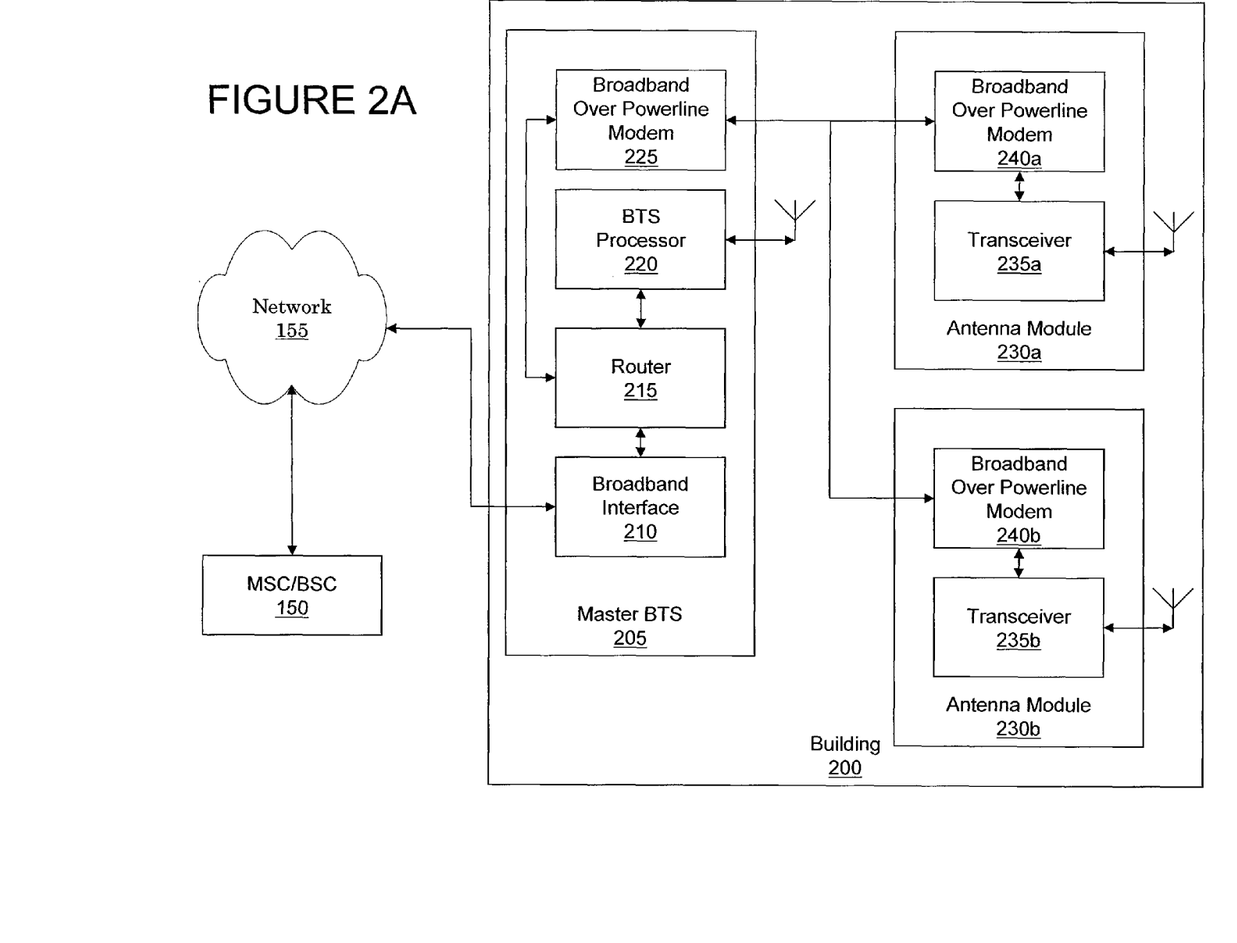
FIG. 2A is a block diagram of an exemplary system in accordance with a fourth aspect of the present invention.

FIG. 2A is a block diagram of an exemplary system in accordance with a fourth aspect of the present invention. The system of FIG. 2A is similar to that of FIG. 1A, except that instead of slave BTSs, one or more antenna modules 230a and 230b can be provided. Accordingly, master BTS 205 operates in a similar manner to that of master BTS 105. Compared to slave BTSs 130a and 130b, antenna modules 230a and 230b do not include a BTS processor, and accordingly, operate in a similar manner to a repeater. Master BTS 205 can distribute data to antenna modules 230a and 230b using the techniques disclosed in U.S. application Ser. No. 11/378,998 "Signal Conditioner and Method for Communicating over a Shared Transport Medium a Combined Digital Signal for Wireless Service", filed Mar. 17, 2006 and/or U.S. application Ser. No. 11/405,917 "System and Method for Transmitting Wireless Digital Service Signals Via Power Transmission Lines", filed Apr. 18, 2006, the entire disclosure of the aforementioned documents is herein expressly incorporated by reference.

Figure 2B:
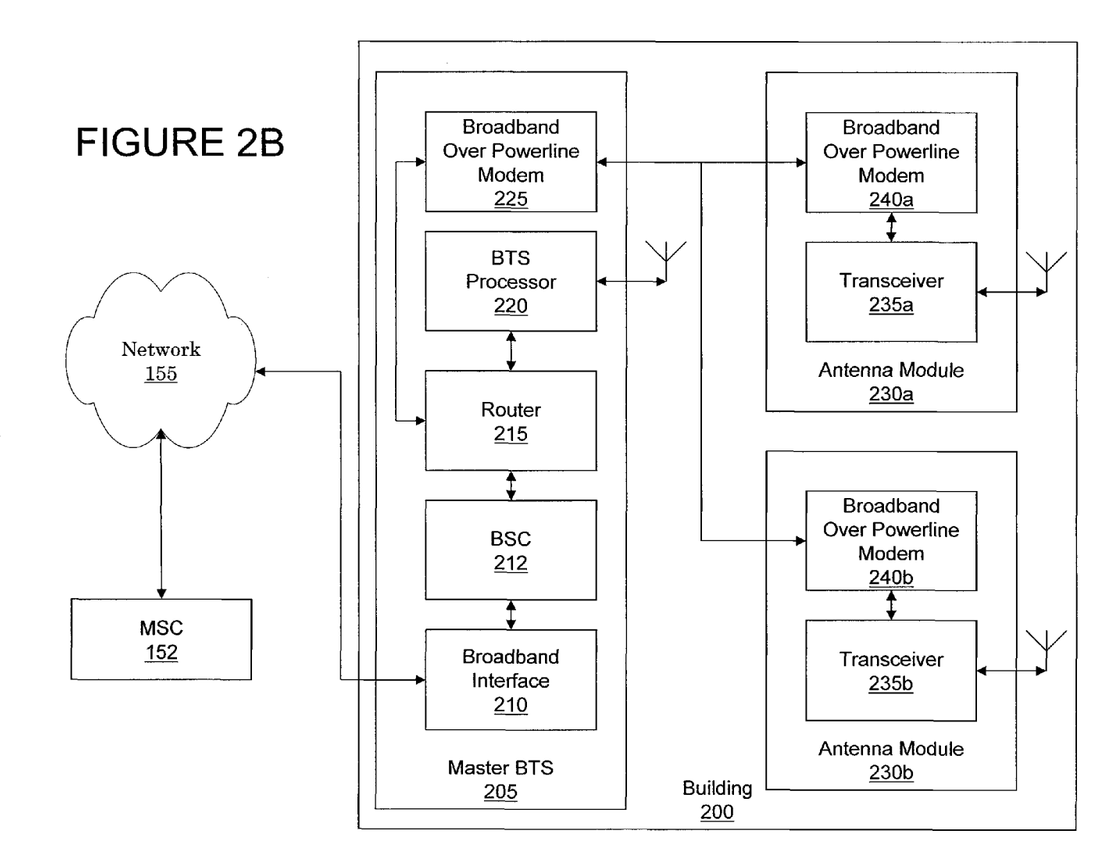
FIG. 2B is a block diagram of an exemplary system in accordance with a fifth aspect of the present invention.

FIG. 2B is a block diagram of an exemplary system in accordance with a fifth aspect of the present invention. The system of FIG. 2B is similar to that of FIG. 2A, except that master BTS 205 includes BSC 212 and is coupled to MSC 152.

Although the systems of FIGS. 1A-1C, 2A and 2B have been illustrated and described separately, one or more these systems can be combined in a single building. For example, a master BTS (such as that illustrated in FIG. 1A) can be coupled to both slave BTSs (such as those illustrated in FIG. 1A) and antenna modules (such as those illustrated in FIG. 2A). Many other combinations of these systems are within the scope of this invention and such combinations are within the level of skill of those in the art.

Figure 3A:
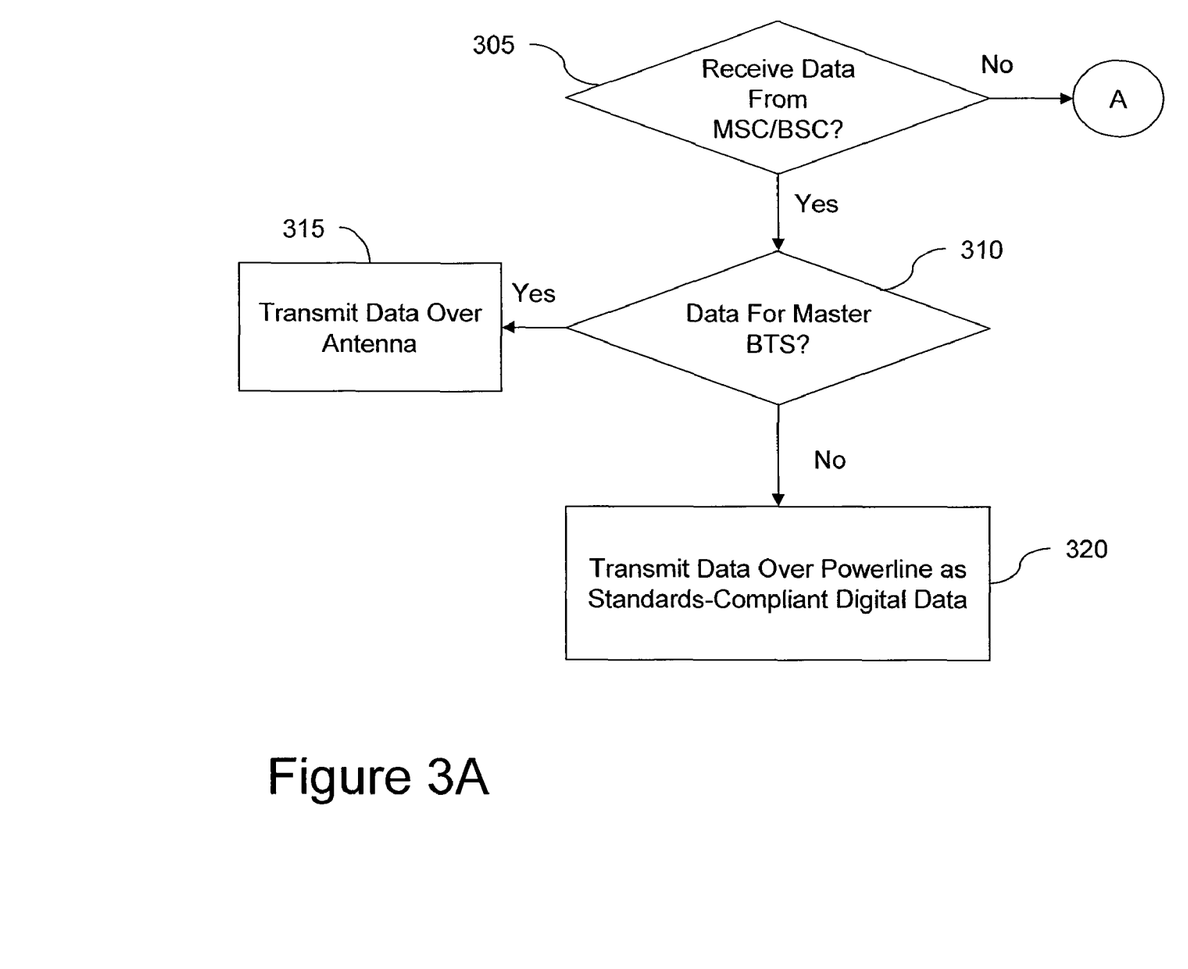
FIGS. 3A-3C are flow diagrams illustrating an exemplary method for a master BTS in accordance with the present invention.
Figure 3B:
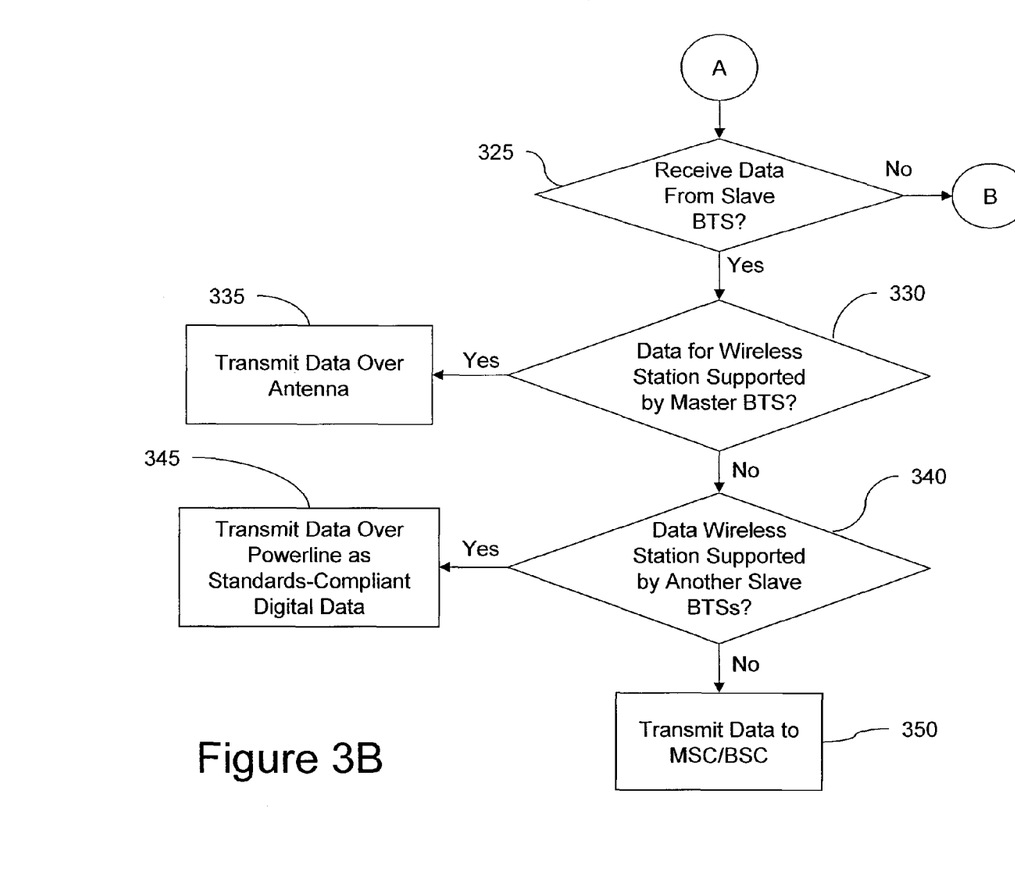
Figure 3C:
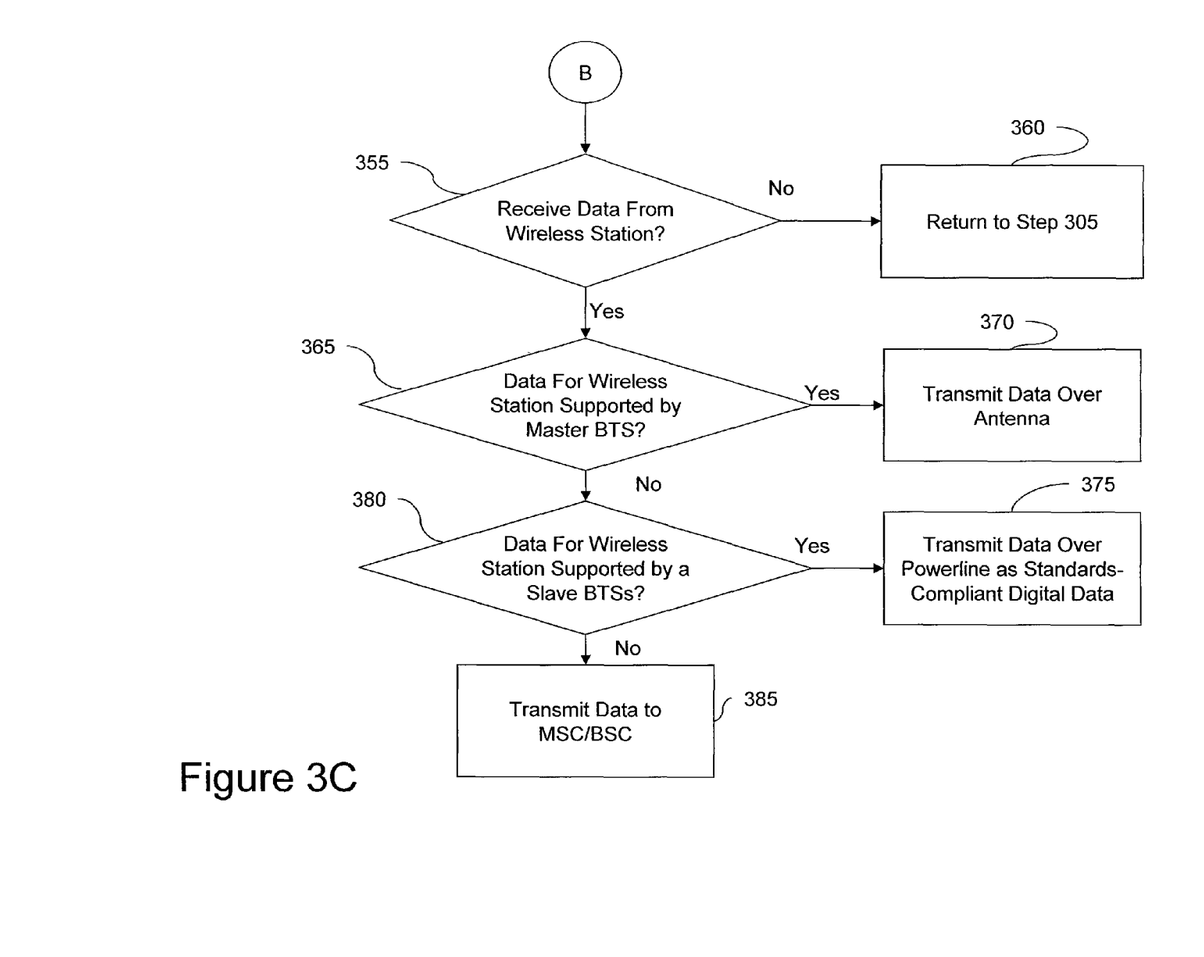

FIGS. 3A-3C are flow diagrams illustrating an exemplary method for a master BTS in accordance with the present invention. Initially, master BTS 105 determines whether it has received data from MSC/BSC 150 (step 305). When data has been received from MSC/BSC 150 ("Yes" path out of decision step 305), then router 115 determines whether the data is for the master BTS (step 310). If the data is for the master BTS ("Yes" path out of decision step 310), then router 115 provides the data to BTS processor 120, which then transmits the data over one or more antennas (step 315). When the data is not for the master BTS ("No" path out of decision step 310), then the data is for one of the slave BTSs and router 115 provides the data to broadband over powerline modem 125, which then transmits the information as standards-compliant digital data to the appropriate slave BTS (step 320).

When master BTS determines that it has not received data from MSC/BSC 150 ("No" path out of decision step 305), then it determines whether it has received data from one of the slave BTSs (step 325). When data has been received from one of the slave BTSs ("Yes" path out of decision step 325), then the data is passed from modem 125 to router 115, which then determines whether the data is for a wireless station supported by master BTS 105 (step 330). This can be determined using any of the aforementioned location registers. When the data is for a wireless station supported by master BTS 105 ("Yes" path out of decision step 330), then router 115 provides the data to BTS processor 120, which in turn transmits the data over one or more antennas (step 335).

When the data is not for a wireless station supported by master BTS 105 ("No" path out of decision step 330), then router 115 determines, using any of the aforementioned location registers, whether the data is for a wireless station supported by another slave BTS (step 340). If the data is for another slave BTS ("Yes" path out of decision step 340), then router 115 provides the data to modem 125, which then transmits it over a powerline as standards-compliant digital data to the intended slave BTS (step 345). If the data is not for a wireless station supported by another slave BTS ("No" path out of decision step 340), then it is intended for MSC/BSC 150. Accordingly, router 115 provides the data to broadband interface 110, which then transmits the data to MSC/BSC 150 via network 155 (step 350).

If data is not received from a slave BTS ("No" path out of decision step 325), then master BTS 105 determines whether data is received from a wireless station supported by the BTS (step 355). If data is not received from a wireless station supported by master BTS 105 ("No" path out of decision step 355), then processing returns to step 305 (step 360). If, however, data is received from a wireless station supported by master BTS 105 ("Yes" path out of decision step 355), then BTS processor 120 determines whether the data is for a wireless station supported by the BTS (step 365). BTS processor 120 can make this determination using its own location register, a location register of router 115, a location register shared with router 115, or an external location register via network 155. When the received data is for a wireless station supported by master BTS 105 ("Yes" path out of decision step 365), then BTS processor transmits the data over one or more antennas (step 370).

When the data received from the wireless station is not for a wireless station supported by master BTS 105 ("No" path out of decision step 365), then BTS processor 120 passes the data to router 115. Router 115 then determines whether the data is for a wireless station supported by one of the slave BTSs by accessing a location register (step 380). When the data is for a wireless station supported by one of the slave BTSs ("Yes" path out of decision step 380), then router 115 passes the data to modem 125. Modem 125 then transmits the data to the intended slave BTS as standards-compliant digital data (step 375). When the data is not for a wireless station supported by one of the slave BTSs ("No" path out of decision step 380), then the data is intended for MSC/BSC. Accordingly, router 115 passes the data to broadband interface 110, which in turn transmits the data to MSC/BSC via network 155 (step 385).

It should be recognized that the method of FIGS. 3A-3C is merely exemplary and that modifications are possible within the scope of the invention. For example, in many instances the particular order of different decisions illustrated in these Figures can be performed in a different order, or concurrently. For example, the decisions of steps 305, 325 and 355 can be performed in a different order from that discussed above, or can be performed concurrently. Moreover, although FIGS. 3A-3C have been described in connection with a master BTS that communicates with an MSC/BSC, the methods are equally applicable to a master BTS that includes a BSC and communicates with a MSC.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for supporting wireless communications, the method comprising the acts of:
    receiving, by a master base transceiver station, data from a base station controller;
    identifying a device supporting a wireless station associated with the data;
    transmitting the data to the identified device in a digital standards-based power line transmission format;
    receiving, by the master base transceiver station, second data from the base station controller; and
    transmitting the second data over an antenna.

2. The method of claim 1, wherein the device is an antenna module.

3. The method of claim 1, wherein the device is a slave base transceiver station.

4. The method of claim 1, further comprising:
    rebroadcasting, by the device, paging channel information, control channels and user traffic channels received from the master base transceiver station.

5. The method of claim 1, wherein the device is located in a building, and the master base transceiver station is coupled to the base station controller via a network external to the building.

6. The method of claim 1, wherein the base station controller is a component of a wireless macro network.

7. The method of claim 1, wherein the master base transceiver station comprises a location register.

8. The method of claim 1, wherein the master base transceiver station is coupled to an external location register.

9. The method of claim 1, wherein the device is an antenna module.

10. The method of claim 1, wherein the device is a slave base transceiver station.

11. A method for supporting wireless communications, the method comprising the acts of:
    receiving, by a master base transceiver station, data from a base station controller;
    identifying a device supporting a wireless station associated with the data;
    transmitting the data to the identified device in a digital standards-based power line transmission format; and
    receiving, by the master base transceiver station, second data from the device in the digital standards-based powerline transmission format; and transmitting the second data over an antenna.

12. The method of claim 11, further comprising:
    rebroadcasting, by the device, paging channel information, control channels and user traffic channels received from the master base transceiver station.

13. The method of claim 11, wherein the device is located in a building, and the master base transceiver station is coupled to the base station controller via a network external to the building.

14. The method of claim 11, wherein the base station controller is a component of a wireless macro network.

15. The method of claim 11, wherein the master base transceiver station comprises a location register.

16. The method of claim 11, wherein the master base transceiver station is coupled to an external location register.

* * * * *